No. 780,342. PATENTED JAN. 17, 1905.
J. H. HUBBELL.
GRINDING MILL.
APPLICATION FILED FEB. 17, 1904.

3 SHEETS—SHEET 3.

Witnesses:
C. D. Kesler.
James L. Norris, Jr.

Inventor
Joseph H. Hubbell
By James L. Norris
Atty.

No. 780,342.                                    Patented January 17, 1905.

UNITED STATES PATENT OFFICE.

JOSEPH H. HUBBELL, OF DAYTON, OHIO, ASSIGNOR TO BUCKEYE IRON & BRASS WORKS, OF DAYTON, OHIO, A CORPORATION OF OHIO.

GRINDING-MILL.

SPECIFICATION forming part of Letters Patent No. 780,342, dated January 17, 1905.

Application filed February 17, 1904. Serial No. 193,987.

*To all whom it may concern:*

Be it known that I, JOSEPH H. HUBBELL, a citizen of the United States, residing at Dayton, in the county of Montgomery and State of Ohio, have invented new and useful Improvements in Grinding-Mills, of which the following is a specification.

This invention relates to grinding-mills; and while I do not limit myself to the use of the machine in any particular field I have found it of especial utility in breaking and granulating or pulverizing oil-cake, in which connection I will hereinafter describe the same.

Oil-cake is a by-product of linseed and cotton-seed after the oil is pressed from the meat thereof. These cakes are generally rectangular in shape and vary somewhat in thickness in different plants and are used for fertilizer and cattle-food. Ordinarily the oil-cake is sacked and shipped in bulk; but there is a growing demand for the ground product. By means of that particular organization of the mill which I have selected for illustration in the accompanying drawings, forming a part of this specification, I am enabled to uniformly reduce the cakes to granular or pulverulent condition and can effectively, rapidly, and economically handle cakes of varying thicknesses in my machine.

Figure 1:
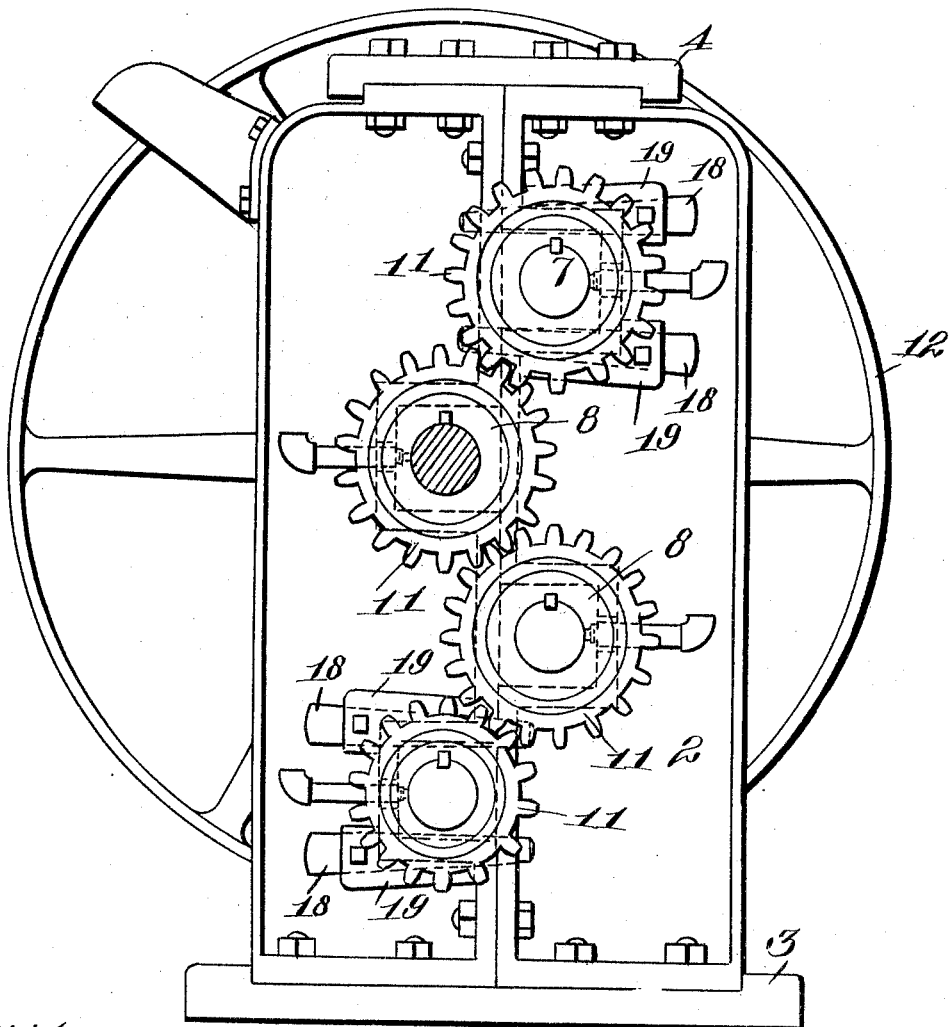
Figure 2:
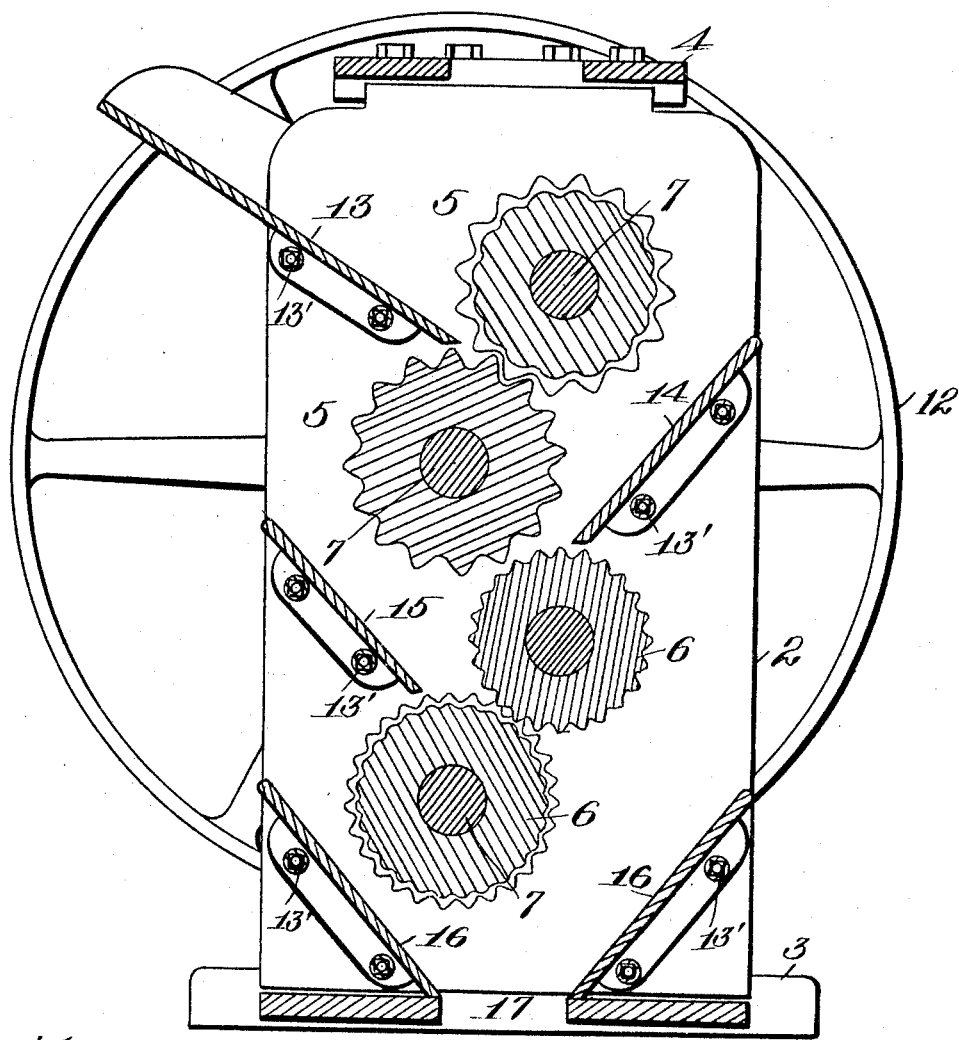
Figure 3:
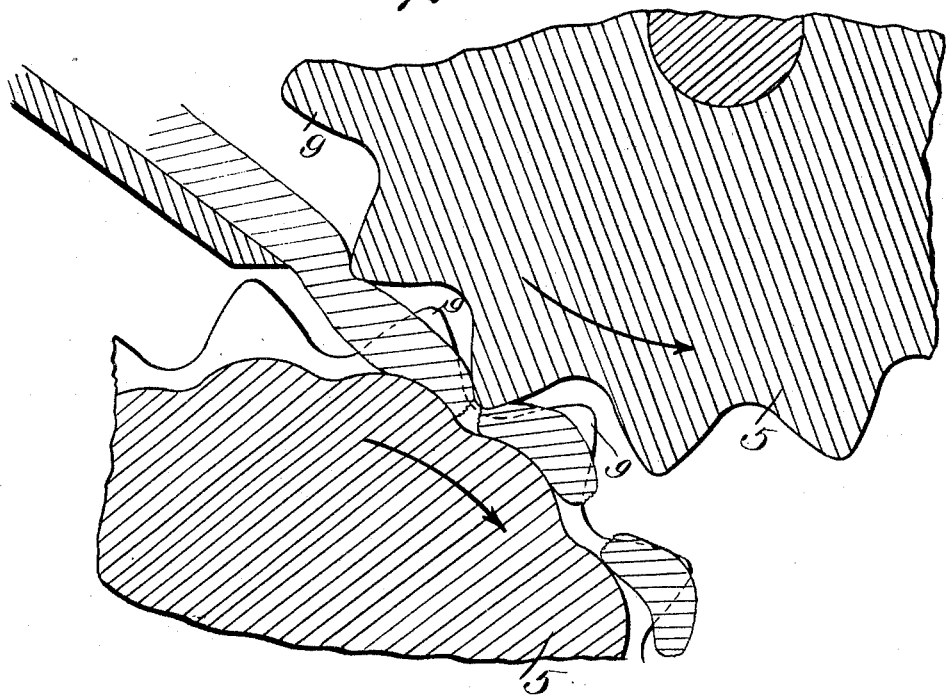
Figure 4:
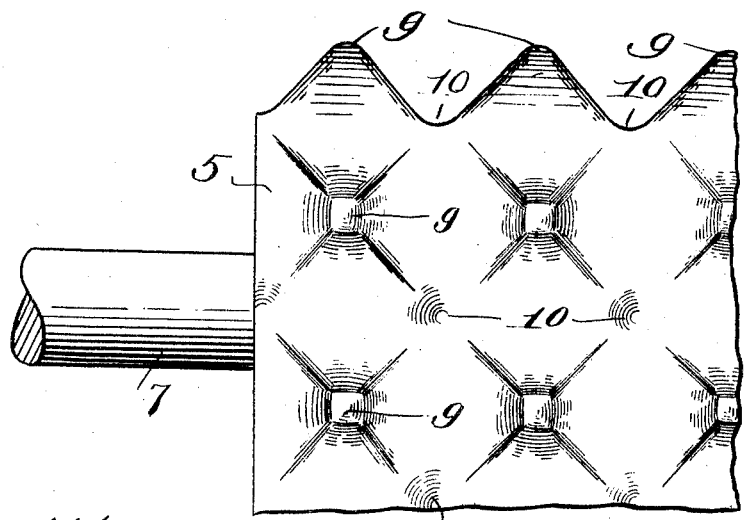

Referring to said drawings, Figure 1 is a side elevation of a mill including my invention. Fig. 2 is a vertical sectional elevation of the same. Fig. 3 is an enlarged detail sectional view of part of a pair of grinding-rolls hereinafter described, showing also the manner of separating the stock. Fig. 4 is a face view of a portion of one of said rolls and its shaft.

As previously indicated, I illustrate in the drawings, to which reference has just been made, one simple and convenient organization of parts comprising my invention, which I will now set forth in detail; but I wish to state that I do not limit myself to the disclosure thus made, for material variations as to many features of the invention may be adopted within the scope of my claims.

The framing illustrated includes the side members 2, arranged in vertical parallelism, the base or bed 3, and the top 4. Each side member 2 is composed of approximately complemental plates, which may be formed in any desirable way and which abut, their abutting edges being flanged and bolted or otherwise suitably united. The terminal portions of the base 3, which latter may be in the form of a suitably-made plate, are recessed to receive the side members 2, the said recesses having squared end walls to form shoulders to abut against the corresponding portions of the said side bars. In other words, the bottoms of the side members snugly fit the recesses in the base. In like manner the terminal portions of the top or crown plate 4 are similarly recessed to snugly receive correspondingly-shaped shoulders upon the upper portions of said side members 2, the several parts constituting the frame being suitably connected together—as, for example, by means of bolts. When said parts are constructed and assembled as illustrated and secured together, the resultant frame presents a stable solid structure.

The base 3 is adapted to rest upon a suitable foundation, while the side members 2 constitute suitable supports for a plurality of grinding-rolls, hereinafter described. Said grinding-rolls, as will be presently set forth, are arranged in staggered order in order to facilitate the feed of the article to be ground through the mill. I have represented four of these rollers, although this number may be varied, said rollers being arranged in coöperating pairs, there being an upper pair, each of which is denoted by 5, and a lower pair, each of which is denoted by 6. The upper pair of rolls preliminarily or initially acts upon the cotton-seed or linseed cake to coarsely separate it, while the lower pair grinds the previously-separated parts into finer particles, and as one roll of each pair, as will hereinafter be set forth, is adjustable with respect to its companion the grade of the product can be varied. I will hereinafter describe the peculiar construction of the upper pair of rolls, said upper pair of rolls being so driven as to maintain a like velocity of their working surfaces, although the opposite applies with respect to the lower rolls. By maintaining a like surface speed of the upper rolls I am enabled to secure a thorough breaking up of the cake. The ends or journal portions of the shafts 7 of the four rolls are rotatively supported by bearing boxes or blocks 8, fitted in slots formed in the side members 2 of the framing. The intermediate bearing boxes or blocks 8 snugly fit their slots—that is to say, they are held against vertical and horizontal motions; but the same does not apply to the terminal bearing-boxes. Said terminal-boxes, however, are held against side movement, although they can move vertically in their slots, the latter being deeper than the coöperating boxes in order to provide for such vertical motion and the corresponding adjustment of the coacting rolls. In this way one roll in each case is made adjustable toward and from its mate, whereby I can regulate the grade of product or can compensate for cake which varies in thickness. The particular means illustrated for moving the terminal rolls to secure the adjustment described will be hereinafter set forth, as will driving mechanism for obtaining a like surface motion of the upper rolls.

As previously set forth, the peripheral construction of the several rolls is the same; but I will now describe in detail the peculiar function secured by the upper pair of rolls, as well as the construction of said upper rolls.

Each upper roll is horizontally and transversely grooved or channeled, the series of channels being at right angles to each other and the respective walls thereof diverging toward the periphery of said roll, so as to form on said periphery or working surface a multiplicity of substantially pyramidal projections or teeth 9, the teeth of course being arranged in longitudinal rows, and between the rows of teeth I form depressions or concavities 10, said depressions or concavities of one roll being adapted to register with the projections of the other roll as the said two upper rolls rotate. It will be seen that these depressions or concavities are arranged in alternation with the teeth of the respective rows. As previously stated, the surface speeds of the two said upper rolls, which, it will be perceived, are of uniform diameter, is uniform, whereby when the rolls operate a row of teeth on one roll will press the stock or cake of cotton-seed or linseed into the depressions or concavities of the other roll, and as the stock or cake is pinched between the two rolls partially around the respective concavities it is completely fractured or broken by the row of teeth, and owing to the number and uniform disposition of said teeth the thorough breaking up of the leading or advance edge of the cake or stock into a multiplicity of pieces is assured. Each roll of course presses the stock into the concavities of the other roll, from which it will be apparent that the rolls work in alternation. After the stock is initially broken or separated it is brought under the action of the lower rolls 6 and is further pulverized by them to the requisite fineness.

As previously stated, while the surface speed of the upper rolls is the same such statement does not apply to the surface speed of the lower rolls, one of them, as will hereinafter appear, having a greater surface speed than the other, which I obtain partly through the driving mechanism and partly by making the lower one of the two lower rolls of greater diameter than its companion roll. The driving mechanism illustrated I will now describe.

Each shaft carries at its opposite ends toothed gears, as 11, arranged in trains in proximity to the outer faces of the two side members 2, and one of the intermediate shafts 7 is shown as equipped at its opposite ends with power-transmitting members 12, which may be pulleys driven by belting (not shown) from any desirable form of motor. I have only represented one of these power-transmitting members 12 in Figs. 1 and 2. When, therefore, the two pulleys or band-wheels are rotated, the several rolls hereinbefore described will be simultaneously driven to put them into action. The lowermost gears, which directly actuate the lowermost roll of the staggered series, hereinbefore described, have less teeth than those of the gears next above the same, by reason of which, coupled with the fact that the two lowermost rolls 6 are of different diameters, I am enabled to secure the desired relative surface speed of said two lowermost rolls, the surface speed of the lower one of said two being greater than that of the other one.

From the foregoing it will be understood that the machine contemplates two pairs of rolls adapted to successively operate upon the stock and of different grinding efficiencies or grades, the final rolls being of greater grinding efficiency than the primary rolls, and as the said final rolls have different surface speeds I am enabled to obtain a very desirable product. By "different grinding efficiencies" I mean to say that the rolls are of different pitches. The top pair of rolls is of greater or coarser pitch than the bottom pair and as a matter of course will feed the cake quicker. The top pair of rolls will not grind the cake to that degree of fineness known as "granulated" no matter how closely they are set, because their pitch is too coarse—that is to say, the peripheral protuberances or projections are spaced too far apart. The pitch of the lower pair of rolls is finer than that of the upper pair, and hence the final rolls are of greater efficiency or they have a greater effect upon the stock than the upper pair. The several rolls may be made in any desired way and may be either of steel or cast-iron to suit individual requirements.

The mill is shown as equipped with an inclined hopper-board 13, suitably fastened between the framing side members 2, and onto which the cake or stock is initially delivered, said inclined hopper-board delivering the stock to the primary rolls 5, where it is initially ground. After the stock is separated or broken up by the said primary rolls it falls in broken or separated condition onto the cant-board 14, which directs the broken particles between the adjacent rolls 5 and 6, which further break such particles, which when further broken fall onto the cant-board 15, which, like the other cant-board, is suitably secured between the said framing members 2. The cant-board 15 supplies the broken particles to the lower rolls 6, which pulverize said particles, the pulverized stock falling into a hopper formed by the boards 16, which converge toward an opening 17 in the bed or base 3, the two boards, like the other ones, being also fastened between the frame members 2. After passing through the opening 17 the finely-pulverized material can be disposed of as desired.

It will be remembered that the terminal blocks or boxes 8 of the rolls have been described as adjustable, the adjustments in the present case being in a vertical direction, and I have found the wedge means now to be described for raising or lowering the adjustable boxes and for maintaining them in their desired shifted positions an entirely satisfactory medium for securing such results.

Each bearing-box of the upper and lower rolls is shown as engaged upon its upper and lower sides by the straight faces of wedges, each denoted by 18, the angular faces thereof being arranged to engage correspondingly-angular faces upon the receptacles 19, forming part of the outer sides of the frame members 2, whereby upon moving the wedges longitudinally the uppermost or lowermost rolls coöperative therewith will be raised or lowered in accordance with the direction that the wedges may be moved. By the adjustment of the rolls in the manner set forth I am enabled to break cakes of variable thicknesses and can granulate or pulverize the product to different degrees of fineness.

By the organization hereinbefore described I am enabled to secure a desirable quality of work without the necessity of running the mill at a high speed, which is a desirable feature. The several parts 13, 14, 15, and 16 are connected to the framing side members by means of elongated slot-and-pin joints, each denoted in a general way by 13', by means of which said parts may be adjusted.

Having thus fully described my invention, what I claim, and desire to secure by Letters Patent, is—

1. In a mill of the class described, a pair of coöperative rotative rolls, each having peripheral teeth arranged in longitudinal rows and depressions between the said rows, said depressions being separated longitudinally of the rolls and alternating laterally with the teeth of the respective rows, the depressions on one roll registering with the teeth of the other roll, on the rotation thereof.

2. In a mill of the class described, a pair of coöperative rotative rolls, each having peripheral teeth arranged in longitudinal rows and depressions between the said rows, said depressions being separated longitudinally of the rolls and alternating laterally with the teeth of the respective rows, the depressions on one roll registering with the teeth of the other roll, on the rotation thereof, combined with mechanism for rotating said rolls at a uniform surface speed.

3. In a mill of the class described, a pair of coöperative rotative rolls, each having peripheral teeth arranged in longitudinal rows and depressions between the said rows, said depressions being separated longitudinally of the rolls and alternating laterally with the teeth of the respective rows, the depressions on one roll registering with the teeth of the other roll, on the rotation thereof, combined with a second pair of coöperative rolls to receive the stock from the first pair of rolls.

4. In a mill of the class described, a pair of coöperating rotative rolls, each having peripheral teeth arranged in longitudinal rows, and depressions between the rows, said depressions being separated longitudinally of the rolls and alternating laterally with the teeth of the respective rows, the depressions of one roll registering with the teeth of the other roll, on the rotation thereof, a second pair of rolls in position to receive the stock from said first pair of rolls, said second pair of rolls also having peripheral teeth, and mechanism for driving the first pair of rolls at a uniform surface speed and the other rolls at a differential surface speed.

5. In a mill of the class described, a pair of coöperating rotary rolls, each having peripheral teeth arranged in longitudinal rows, and depressions between the rows, said depressions being separated longitudinally of the rolls and alternating laterally with the teeth of the respective rows, and the depressions of one roll registering with the teeth of the other roll, on the rotation thereof, and means for adjusting one of said rolls with respect to the other.

6. In a mill of the class described, a pair of coöperating rotary rolls, each having peripheral teeth arranged in longitudinal rows, and depressions between the rows, said depressions being separated longitudinally of the rolls and alternating laterally with the teeth of the respective rows, and the depressions of one roll registering with the teeth of the other roll, on the rotation thereof, a second pair of rotary rolls in position to receive the stock from the first pair of rolls, intermeshing toothed gears connected with the several rolls, one of said gears having a less number of teeth than its coöperating gear, and means for positively driving one of the rolls.

7. In a mill of the class described, a pair of coöperative rotary rolls each having peripheral teeth arranged in longitudinal rows and depressions between the rows, said depressions being separated longitudinally of the rolls and alternating laterally with the teeth of the respective rows and the depressions of one roll registering with the teeth of the other roll on the rotation thereof, a second pair of rolls in position to receive the stock from the first pair of rolls, and means for adjusting one roll of each pair with respect to its companion.

8. A grinding-mill roll having peripheral teeth arranged in longitudinal rows, and depressions between the said rows, said depressions being separated longitudinally of the roll and alternating laterally with the teeth of the respective rows.

In testimony whereof I have hereunto set my hand in presence of two subscribing witnesses.

JOSEPH H. HUBBELL.

Witnesses:
FRED. F. RIKE,
GEORGE F. HALE.